(12) United States Patent
Burton et al.

(10) Patent No.: US 9,623,975 B2
(45) Date of Patent: Apr. 18, 2017

(54) LOW PROFILE PASS-THROUGH ELECTRICAL CONNECTOR

(71) Applicant: Battelle Memorial Institute, Columbus, OH (US)

(72) Inventors: Brett Burton, Columbus, OH (US); Andrew Cox, Columbus, OH (US); Darren Wolfe, Hilliard, OH (US)

(73) Assignee: Battelle Memorial Institute, Columbus, OH (US)

( * ) Notice: Subject to any disclaimer, the term of this patent is extended or adjusted under 35 U.S.C. 154(b) by 979 days.

(21) Appl. No.: 13/909,061

(22) Filed: Jun. 3, 2013

(65) Prior Publication Data

US 2014/0151352 A1 Jun. 5, 2014

Related U.S. Application Data

(60) Provisional application No. 61/654,787, filed on Jun. 1, 2012.

(51) Int. Cl.
| | |
|---|---|
| *B60L 1/02* | (2006.01) |
| *B64D 15/12* | (2006.01) |
| *H01B 7/00* | (2006.01) |
| *H05B 3/02* | (2006.01) |
| *B64C 1/36* | (2006.01) |

(52) U.S. Cl.
CPC .............. *B64D 15/12* (2013.01); *B64C 1/36* (2013.01); *H01B 7/00* (2013.01); *H05B 3/02* (2013.01); *H05B 2203/016* (2013.01); *H05B 2214/02* (2013.01); *Y10T 29/49016* (2015.01); *Y10T 29/49083* (2015.01); *Y10T 29/49826* (2015.01)

(58) Field of Classification Search
CPC ...... B64D 15/12; H05B 3/02; H05B 2214/02; H05B 2203/016; H01B 7/00; B64C 1/36; Y10T 29/49826; Y10T 29/49016; Y10T 29/49083
See application file for complete search history.

(56) References Cited

U.S. PATENT DOCUMENTS

| | | | |
|---|---|---|---|
| 5,248,265 | A | 9/1993 | Goto |
| 6,350,093 | B1 | 2/2002 | Petersen |

(Continued)

FOREIGN PATENT DOCUMENTS

| | | | |
|---|---|---|---|
| BE | | 513611 A | 8/1952 |
| BE | | 533533 A | 12/1954 |
| DE | 10 2004 042423 A1 | | 3/2006 |

(Continued)

OTHER PUBLICATIONS

EP Search report issued Sep. 26, 2014 in EP Application No. 13002841.8.

(Continued)

*Primary Examiner* — Shawntina Fuqua
(74) *Attorney, Agent, or Firm* — Frank Rosenberg; C. Michael Gegenheimer

(57) ABSTRACT

A low profile pass-through electrical connector is designed for aerospace applications. The connector allows voltage and current to pass-thru a conductive wing surface, while maintaining a low profile height for aerodynamic performance considerations. Examples of applications of the electrical connector include power for thin film heaters and communication antennae applications.

20 Claims, 10 Drawing Sheets

(56) References Cited

U.S. PATENT DOCUMENTS 8,834,298 B2    9/2014  Sullivan
2013/0176186 A1*  7/2013  Yaccarino ............... H01P 1/387
                                                    343/787

FOREIGN PATENT DOCUMENTS

FR    2933378 A1    1/2010
GB     666609      2/1952

OTHER PUBLICATIONS

Josekutty, Joby "Speed of a Commercial Jet Airplane", 2002, 4 pages.
Official Action mailed May 17, 2016 in EP Application No. 13 002 841.8.
Official Action mailed Mar. 23, 2015 in U.S. Appl. No. 13/908,885.
Official Action mailed Oct. 22, 2015 in U.S. Appl. No. 13/908,885.
Official Action mailed Apr. 14, 2016 in U.S. Appl. No. 13/908,885.

* cited by examiner

LOW PROFILE PASS-THROUGH ELECTRICAL CONNECTOR

RELATED APPLICATION

This application claims priority to U.S. provisional patent application Ser. No. 61/654,787, filed 1 Jun. 2012.

STATEMENT OF GOVERNMENT INTEREST

This work was conducted with funding from the U.S. government through Contract No. CON00008573. The government has certain rights in the invention.

SUMMARY OF THE INVENTION

The present invention is directed toward a low profile pass-thru connector for passing electrical voltage and current through a conductive wing surface, which are typically made of carbon fiber or aluminum. Preferably, the connector maintains a low profile height with respect to the wing surface, to maintain the wing's aerodynamic performance. The pass-thru connector may provide power to thin film heaters used for anti-icing/de-icing purposes, and can alternatively (or in combination) be utilized for other purposes such as communication antennas. Thin film heaters may require high electrical currents, so the pas s-thru connector must have sufficient cross-sectional area where it travels through the wing to prevent overheating. It also should make a transition to a thin conductive (preferably copper) strip conductor to interface with the thin film heaters. This thin copper strip does not overheat with high current use because the airflow during flight keeps it cool due to forced convection. In one variant, the total thickness of the thin film heater cannot be more than 0.020 inches (0.51 mm), and to this end, the thin copper leads for this application are preferably 0.005 inches (0.013 mm) thick or less.

The invention includes any of the designs described herein including generalizations of these designs, portions of each design, as well as combinations of the designs. The invention also includes methods of making conductive assemblies and/or flying vehicles comprising the conductive assemblies. The invention also includes methods of using a heating element or antenna comprising using any of the conductive assemblies and/or flying vehicles described herein; for example, a method of deicing or heating an aerodynamic surface, or powering an antenna on an aerodynamic surface, comprising passing an electric current through any of the pass-through conductors described herein. Any of the inventive aspects can be described as forming a finished conductive assembly without solder. A nonlimiting list of the inventive concepts includes any of the following aspects.

In one aspect, the invention provides a conductive assembly, comprising: a heating element or antenna; an electrically conductive pin that is electrically connected to the heating element or antenna; a mating socket that is adapted to mate with the conductive pin; and an electrically insulating sleeve disposed around the circumference of the pin and/or mating socket.

In another aspect, the invention provides a flying vehicle (that is, a missile or manned or unmanned aircraft) comprising the conductive assembly disposed on an aerodynamic surface (preferably a wing) wherein the heating element or antenna is disposed on the exterior surface of the flying vehicle and the electrically conducting pin and mating socket form an electrical pathway from the exterior of the flying vehicle to the interior (for example, from the surface of a wing to the interior of the wing). In some preferred embodiments, there is no solder on the conductive pin. In some preferred embodiments, the electrically insulating sleeve comprises a threaded polymer and the pin is a screw-type pin that is adapted to screw through the threaded polymer.

The invention also includes a method of making a conductive assembly or flying vehicle comprising any of the assembly steps described herein. In some embodiments, a conductive assembly comprising a heating element (in some embodiments, a plurality of heating elements) or an antenna and having one or (usually) more conductive pins is pressed through aperture(s) formed by an electrically insulating sleeve(s) that is (are) disposed in and pass through the surface of an airfoil. The electrically conductive pin(s) mate with a socket(s) to form an electrical pathway through the airfoil surface. In some preferred embodiments, no solder is required to install the conductive assembly on the airfoil surface.

In another aspect, the invention provides a method of conducting electricity from the inside to the outside of an airfoil (or vice versa), that comprises passing electricity through the electrically conductive pin. In a preferred embodiment, this method is conducted while a fluid passes over the surface of the airfoil at a velocity of at least 200 mph (320 km). This condition would typically be encountered during flight but would not be experienced by a structure on the ground.

In a further aspect, the invention provides a flying vehicle comprising an airfoil (such as a wing) comprising a conductive wire passing from the inside of the airfoil to the outside of the airfoil and an insulating sleeve disposed around the conductive wire. Preferably, the insulating sleeve is fit by compression into the airfoil. In some embodiments, the conductive wire is a screw that has a flat head that conforms to the surface of the airfoil.

In yet another aspect, the invention provides a conductive assembly, comprising: a heating element or antenna; an aerodynamic surface; a connector base forming a pathway through the aerodynamic surface; a floating center disposed inside the connector base; and an electrical conductor disposed within the floating center. The invention also includes a flying vehicle comprising this conductive assembly, the corresponding methods of making these assemblies, and the corresponding methods of using the heating elements or antennas. The floating element can be loose and able to move in the x and y directions while remaining immobile in the z-direction; in this case, the assembly is typically an intermediate structure. The intermediate structure can be treated with an adhesive that secures the copper conductor (or other strip conductor) and/or the heating element and/or the antenna; the adhesive also secures the floating center so that is no longer floating. The connector base is typically cylindrical. The connector base and floating center preferably have the same length. The connector base may have a rim that retains a cylindrical floating center or an eyelet in the airfoil surface can retain the floating center. In preferred embodiments, a snap ring (also called a retainer ring) prevents the floating center from moving up through the airfoil surface and preferably immobilizes the floating center in the z direction (that is, the direction normal to the airfoil surface). Preferably, a retaining ring is disposed around and at the top part (that is, the part nearest the airfoil surface) of the floating center. In one embodiment, the retainer ring is a cut circle that snaps into place; this ring may have a c-shape that acts as a spring by pressing against the rim of the connector base. Typically, the floating center contains a socket. The socket can complete the electrical connection from the interior of an airfoil to a heater element or antenna on the surface of the airfoil. As with other aspects of the invention, the heater element or antenna can be plugged into (or removed from) the socket in the floating center. In some embodiments, the top portion of the connector base and the floating center form a groove that can be filled by an adhesive that anchors the floating center and may also secure the heating element or antenna to the airfoil surface. Desirably, the connector base and floating center are electrically insulating.

DETAILED DESCRIPTION OF THE INVENTION

While various embodiments of the present invention are described herein, it should be understood that they have been presented by way of example only, and are not intended to limit the invention.

In one embodiment, the invention provides a low profile pass-through electrical connector that connects or is adapted for connecting an electrical conductor on a outer surface of a plane wing to conductors in the interior of the plane wing, comprising: a conductive pin (e.g., a brass pin of 12-14 gauge); non-conducting vented fastener for receiving the pin; a captive nut configured to thread around the fastener in the interior of the wing; a non-conductive sheath; a micro-jack connector press fit into the non-conductive sheath; and a wire.

Figure 1:
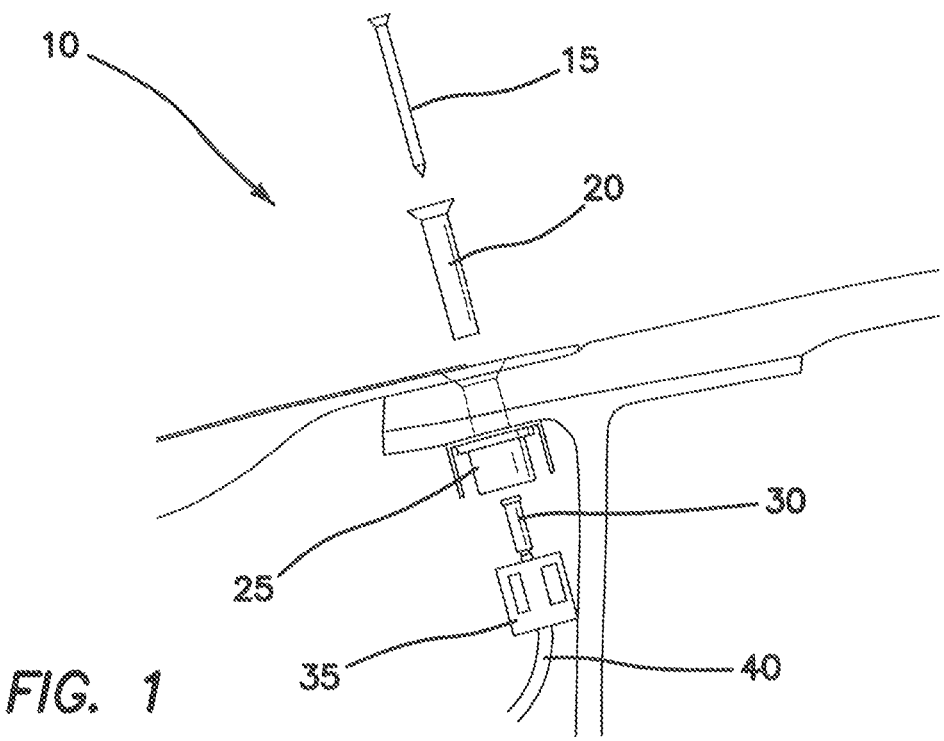
FIGS. 1-3 illustrate a low profile pass-through electrical connector comprising an electrically conductive pin passing through a non-conductive sheath.
Figure 2:
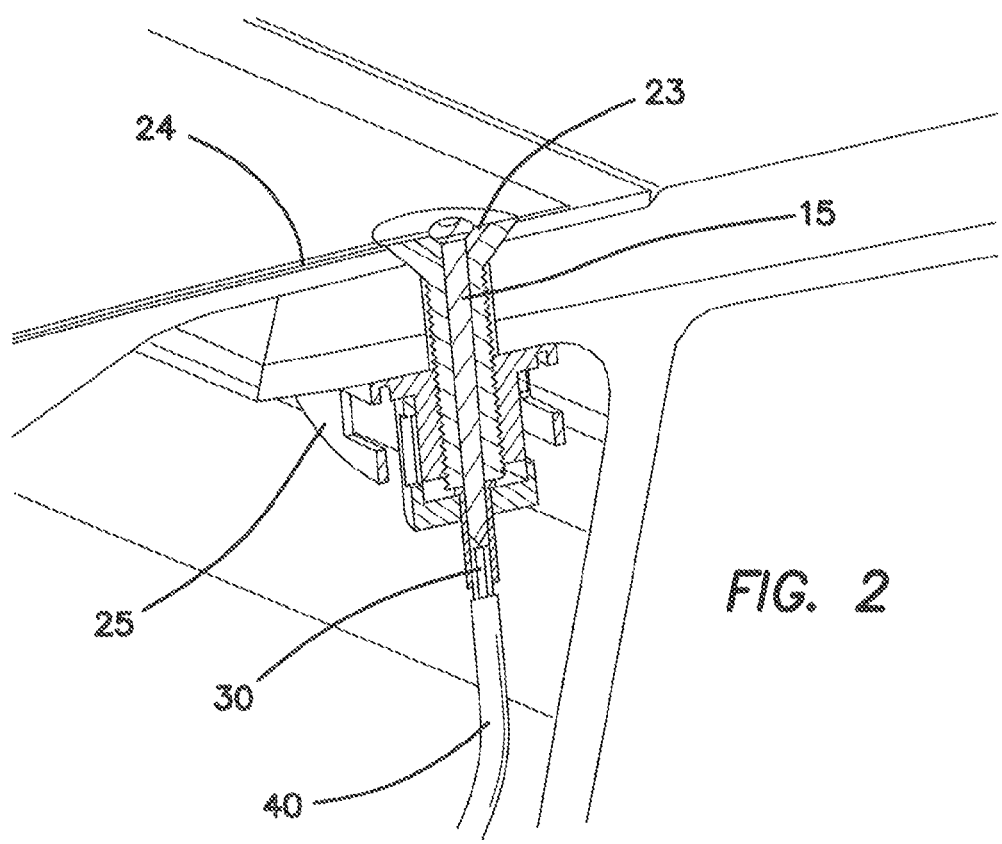
Figure 3:
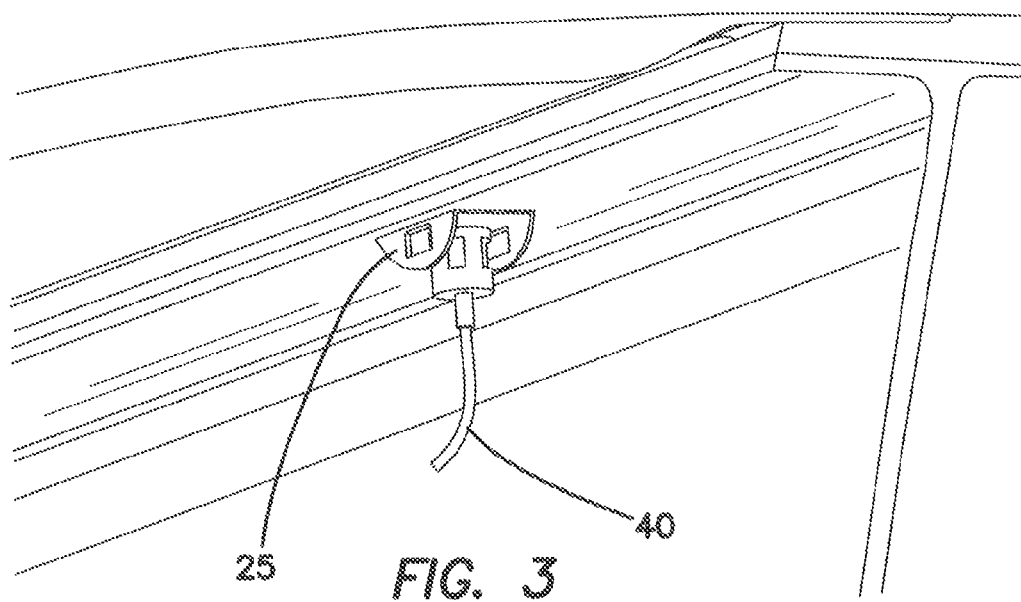

Referring to FIGS. 1-3, a low profile pass-through electrical connector 10 comprises: a conductive brass pin 15 of 12-14 gauge; a ¼-20 size (¼ inch diameter, 20 threads per inch; 0.64 cm diameter, 8 threads per cm) non-conducting vented fastener 20 that has been modified for fitment of a brass conductor; a captive nut 25; a micro-jack connector 30, press fit into the non-conductive sheath; a non-conductive sheath 35; and a wire 40. FIG. 2 illustrates a cutaway view of the assembled pass through connector, with a solder joint 23 where the thin copper lead 24 connects to the head of the 12-gauge pin. FIG. 3 is a bottom view of the pass through connector assembly.

Figure 4:
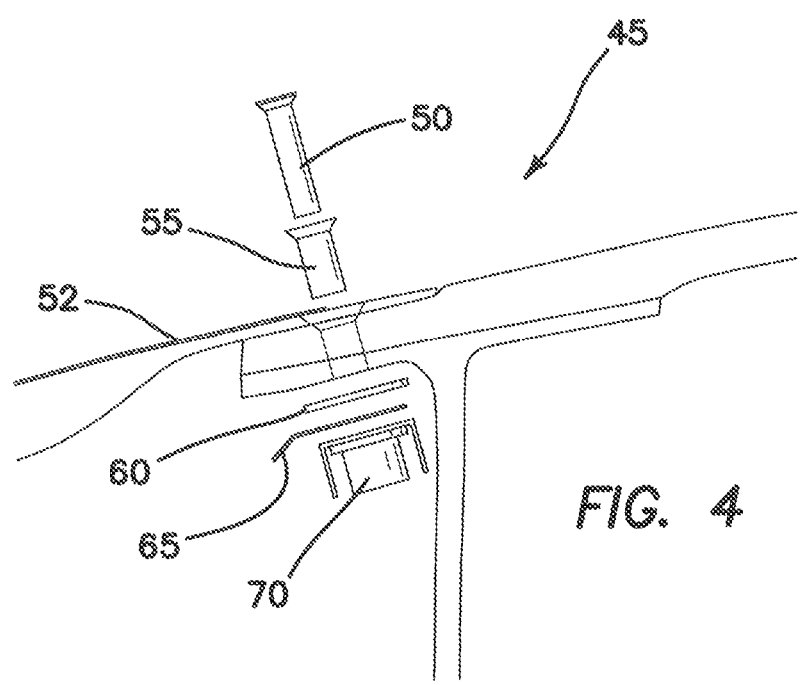
FIGS. 4-6 illustrate a low profile pass-through electrical connector in which a copper lead is sandwiched between a steel screw and an insulating sleeve.
Figure 5:
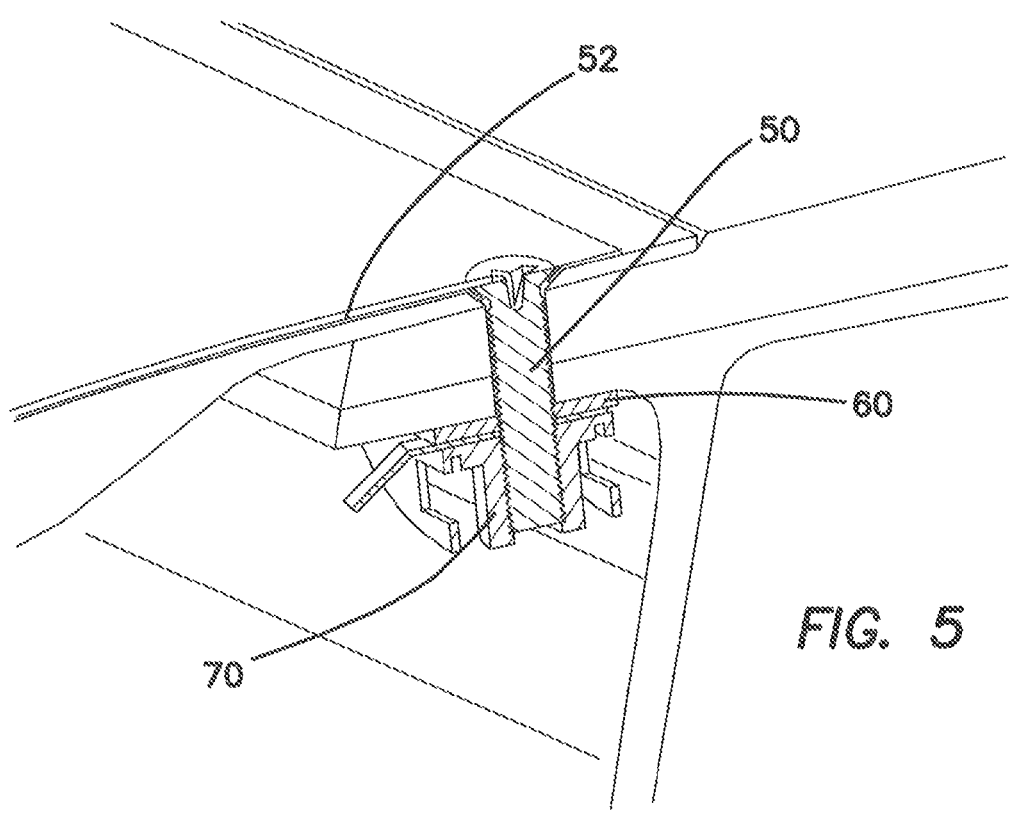
Figure 6:
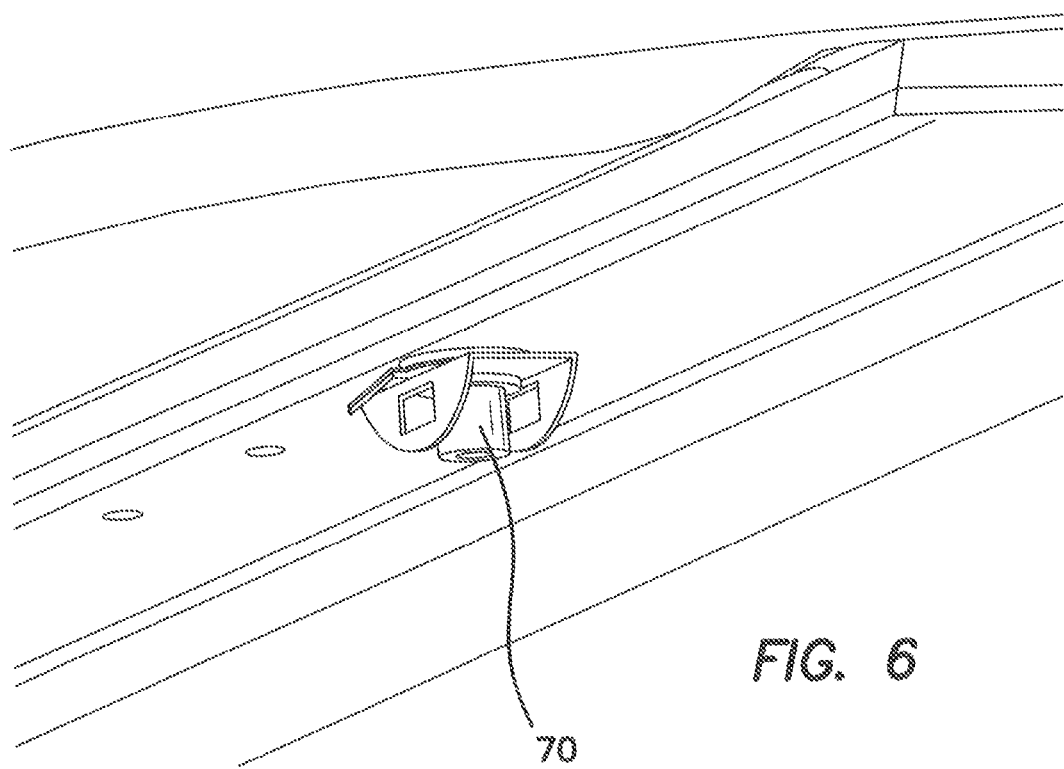

In another embodiment, referring to FIGS. 4-6, a low profile pass through electrical connector 45 comprises: a number 10, 100-degree (25/64 inch, 0.99 cm nominal diameter, 100-degree is the angle formed by the tapered screw head) flat-head stainless steel screw 50; a wide flange nylon insulating sleeve 55; a wide nylon insulating washer 60; a copper ring terminal with solder flange 65; and a captive nut 70. FIG. 4 is an exploded view and FIG. 5 is a cutaway view of an assembled connector. The thin copper lead 52 is sandwiched between the head of the screw and the nylon sleeve in this concept to complete the electrical connection. This obviates the need for a solder joint.

Figure 7:
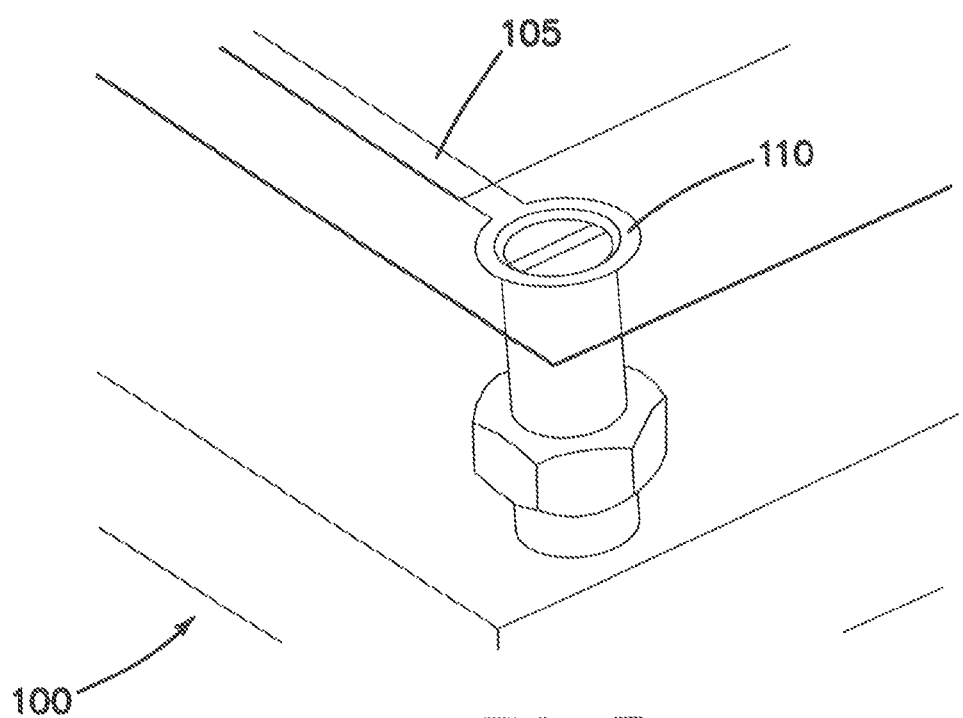
FIGS. 7-9 illustrate a low profile pass-through electrical connector in which the use of a conductive screw avoids the use of solder to fasten the conductive lead.
Figure 8:
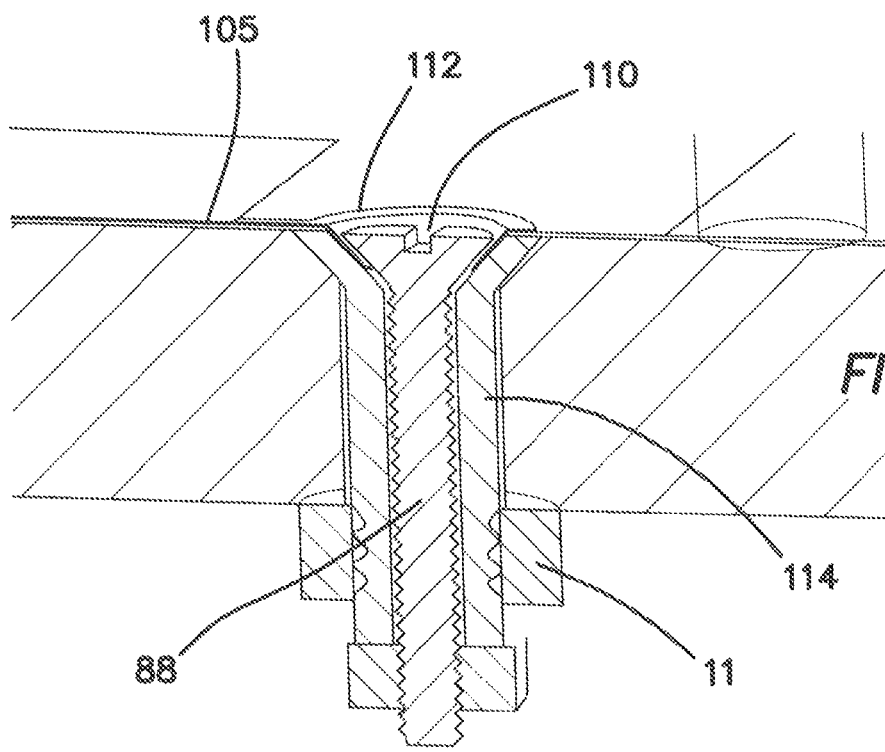
Figure 9:
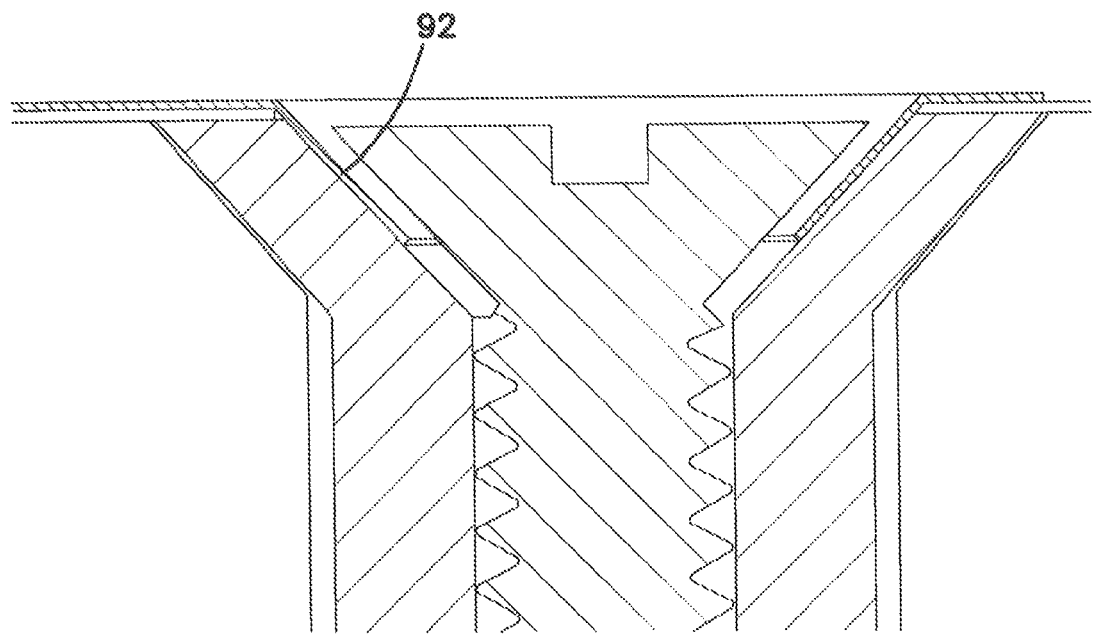

In a further variant, referring to FIGS. 7-9, a low profile pass through electrical connector 100 comprises a copper lead 105 that has been cut with an eyelet shaped feature 110 on one end. This eyelet shape is then swaged into a countersink shape. The countersunk eyelet provides for a large contact area for the thin copper lead.

FIGS. 7-9 illustrate a compression connection without the need for any solder connections. This design uses a polymer insulating insert 114, made from a material such as Noryl™, that is fastened to the wing surface by means of a threaded nut 11. The head of the insert has a countersink shape 112, which allows it to mount flush to the wing surface with a countersunk hole in the wing. The inside of the insert 114 is also threaded, and a conductive screw 88 (such as aluminum) is threaded into it as the pass-thru conductor. The screw also has a countersink head, which sandwiches the countersink shape of the swaged copper lead 92 into the head of the insulating insert. FIG. 7 is a top view, FIG. 8 is a cutaway view and FIG. 9 is a close-up cutaway showing the compression fit.

In another example, referring to FIGS. 10-13, the low profile pass-through electrical connection comprises:
155—a flattened conductive lead (preferably copper).
160—conductive pin.
165—electrically insulating sleeve.
170—conductive socket for mating with the conductive pin.
175—electrical power wire.

FIGS. 10-13 illustrate a mated pin and socket connection. MIL-SPEC (United States military specifications) pins and sockets improve the shock- and vibration-resistance of the connection. The mated pin 160 and socket 170 connection uses a comparatively smaller area, allowing a greater density of connections to be made. This can improve the performance of the thin film heater by allowing a higher resolution of individual heater control. A conductive wire (such as wire 40) can be connected to socket 170 by crimping or soldering. Typically, the socket 170 is potted in place. A preferred potting compound is an epoxy that produces a seal that is air and water tight. As can be seen in the drawings, on the airfoil-surface-facing side of socket 170 there is a hollow receptacle for receiving the conductive pin 160. Preferably, surfaces for electrical connections are gold plated. The thin film heater 195 can be removed and replaced without having to undo any internal wiring connections since the socket is fastened to the insert.

Figure 10:
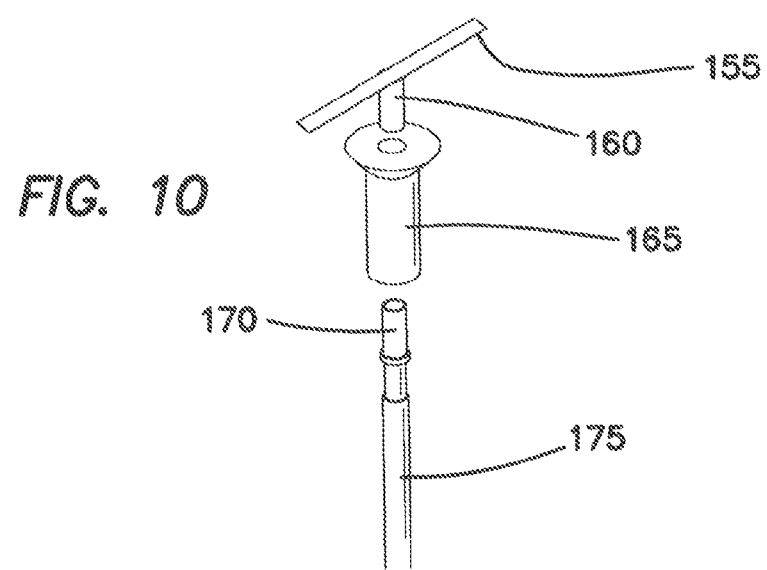
FIGS. 10-13 illustrate a low profile pass-through electrical connector comprising a pin and socket.
Figure 11:
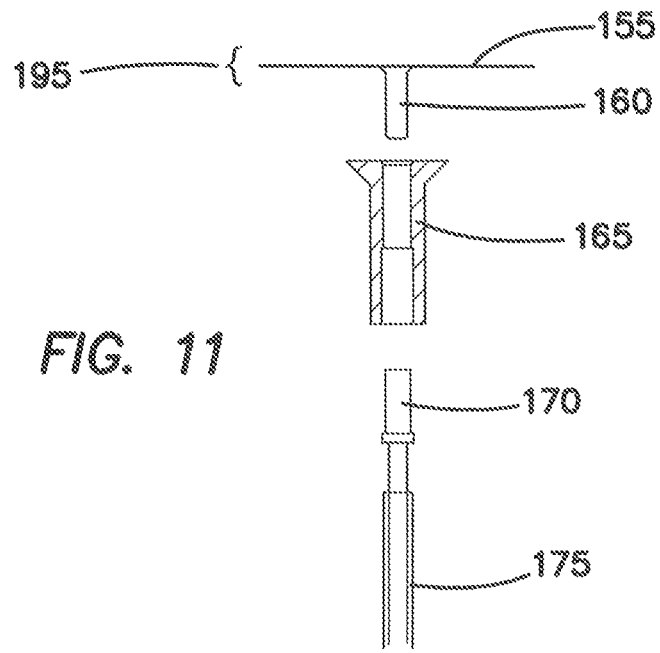
Figure 12:
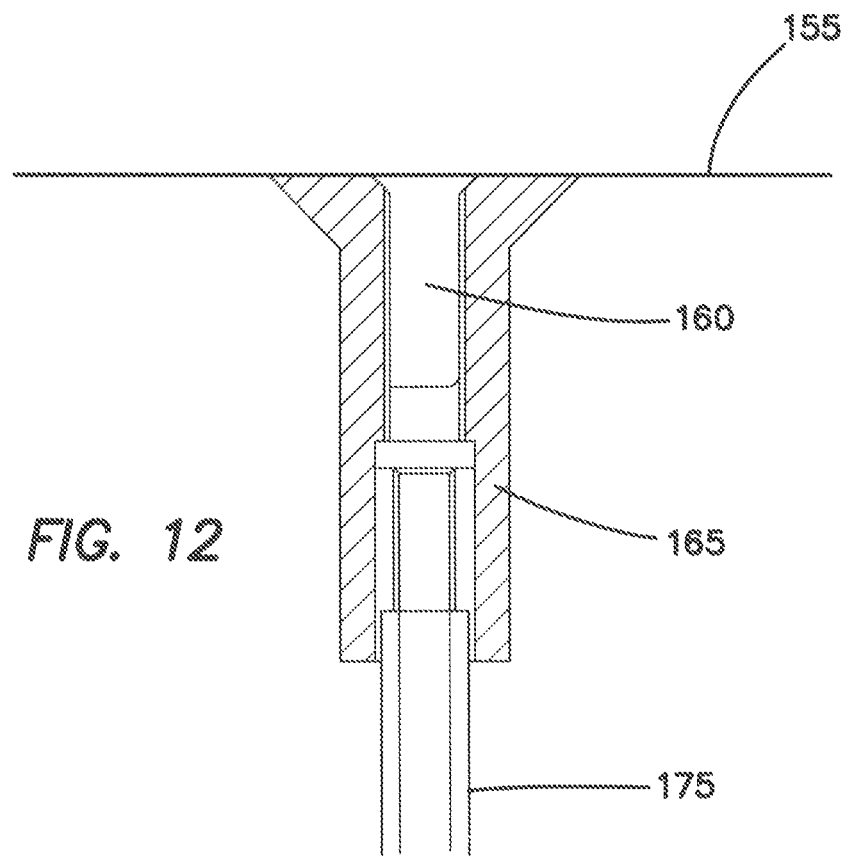
Figure 13:
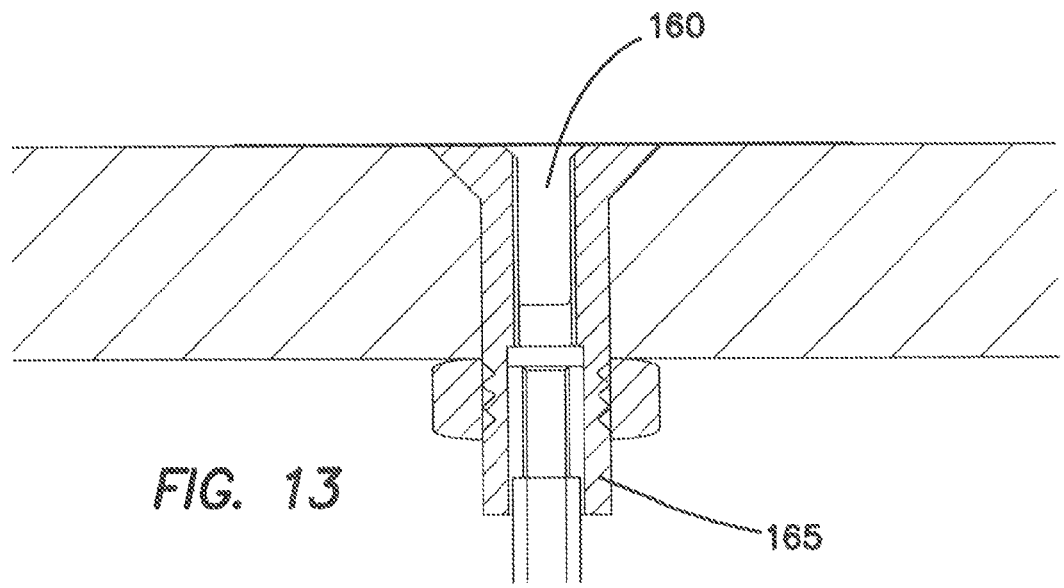

FIG. 10 illustrates a mating receptacle in an exploded view. FIG. 11 is an exploded cutaway view, and FIG. 12 is an illustration of a mated pin and socket cutaway. FIG. 13 shows a cutaway of the complete thin film heater assembly, including the wing section.

Figure 14:
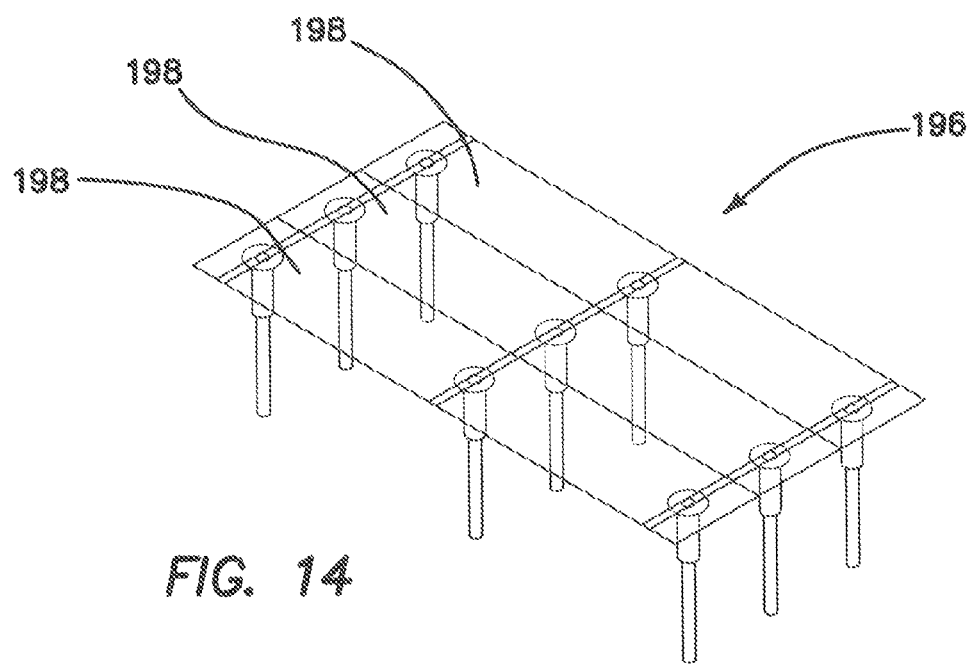
FIG. 14 illustrates an assembly comprising multiple thin film heaters stacked in close proximity.

FIG. 14 illustrates a heater and pass-thru assembly 196 illustrating multiple thin film heaters 198 can be stacked in close proximity using a tiled approach with a pass-thru connector design.

FIGS. 15-18 illustrate example embodiments of the low profile pass through electrical connection comprising a mated pin and socket connection.

Figure 15:
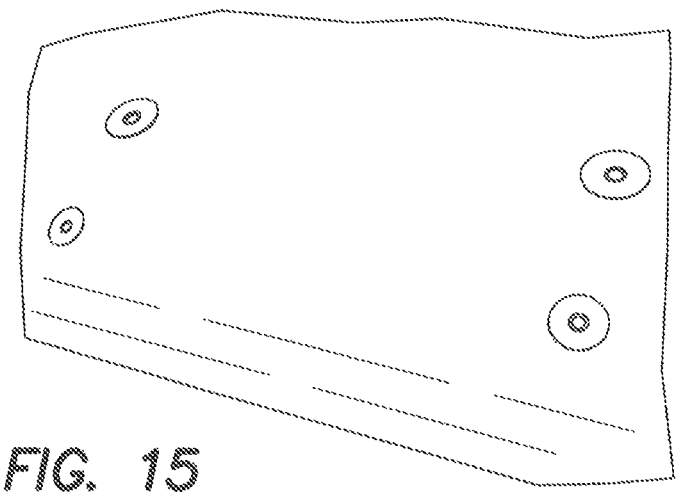
FIGS. 15-18 show photographs of low profile pass-through electrical connectors.

FIG. 15 is a photograph of insert receptacle assemblies installed in a wing surface.

Figure 16:
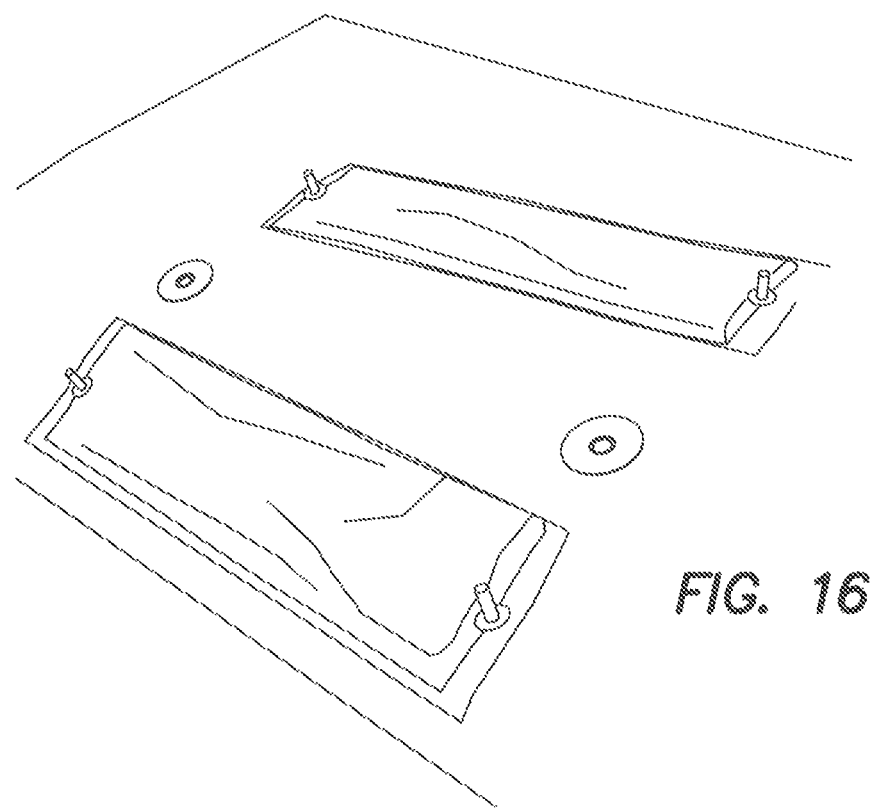

FIG. 16 is a photograph of thin film heaters with a pin mating interface.

Figure 17:
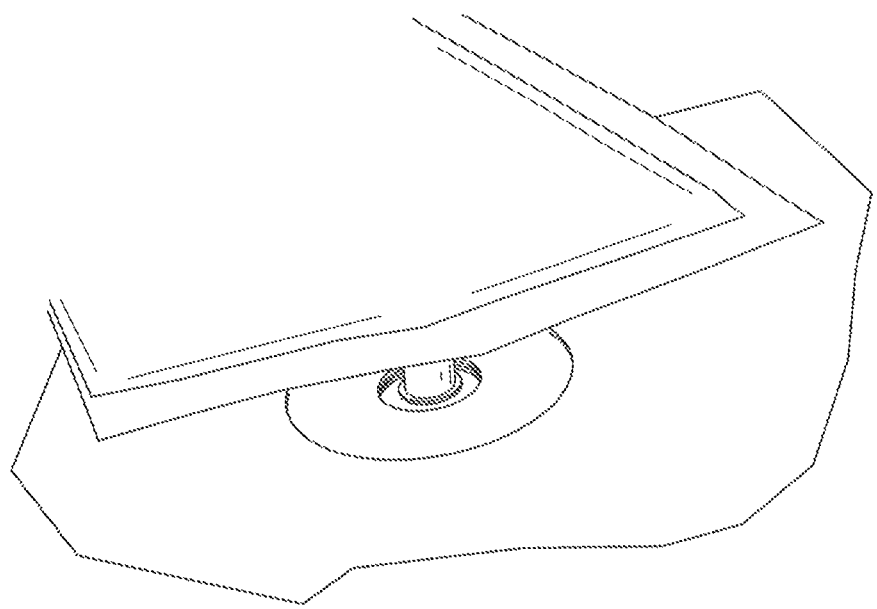

FIG. 17 is a photograph illustrating a mating of pin with insert receptacle.

Figure 18:
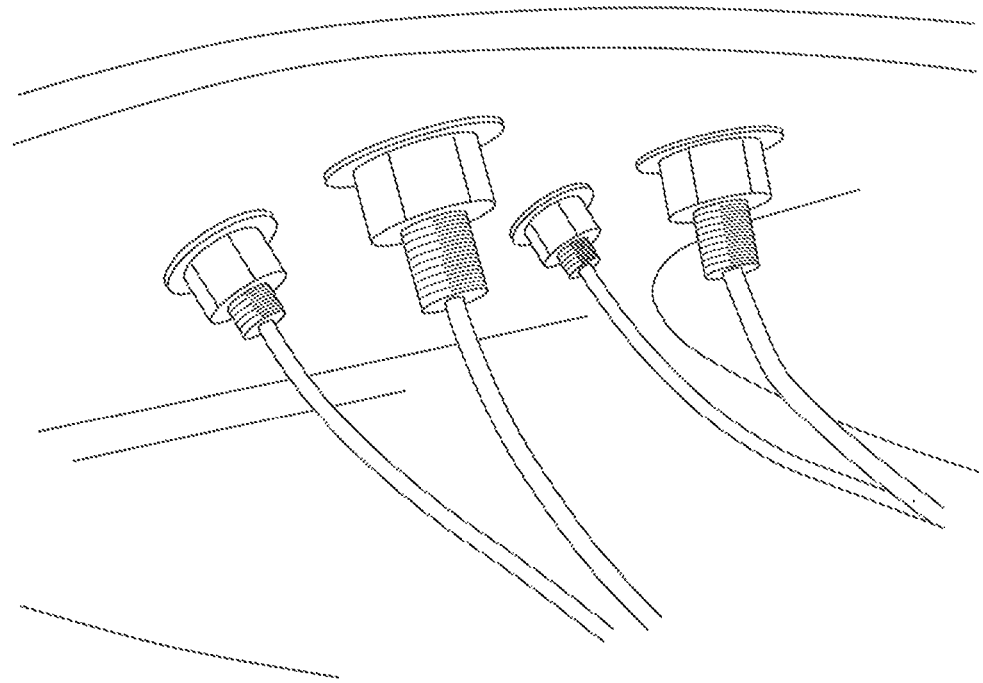

FIG. 18 is a photograph of an inside of a wing showing pass-thru receptacle wiring.

Figure 19:
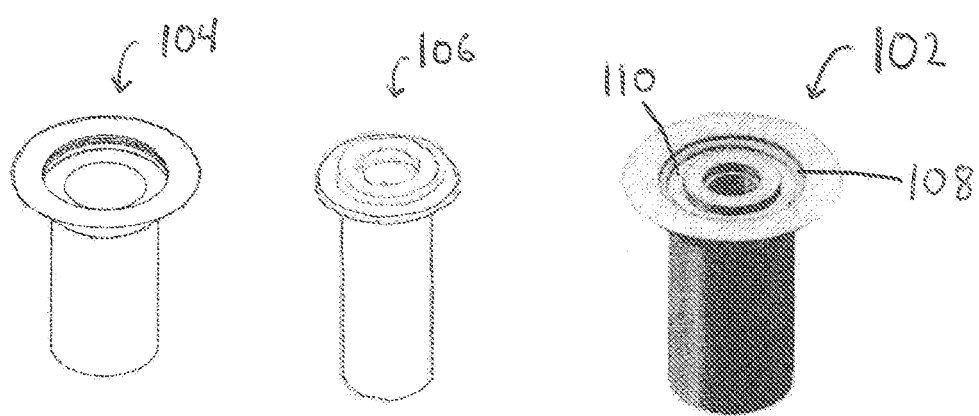
FIG. 19 illustrates a floating pass through connecter (far right), connector base (far left), and floating center (center).

The floating pass through connector is illustrated in FIG. 19. The illustrated floating pass through connector 102 is comprised of 4 main parts: the connector base 104, the floating center 106, the socket (not visible in FIG. 19), and the snap ring 108. The interior of floating center 106 can be identical to the interior of electrically insulating sleeve 165. Similarly, the socket is inserted into the floating center and potted in-place with an electrical wire. The connector base 104 is epoxied in-place into the wing surface. The floating center 106 is then installed into the connector base, and is held in place by the snap ring (also called a retainer ring). The floating center can move laterally in the X and Y-plane, but the snap ring prevents it from moving axially. Once a thin-film heater is applied onto the wing surface, the epoxy used to apply the heater fills the groove 110 where the snap ring resides. This solidifies the connector, adds structural strength, and prevents movement in the future. The floating aspect only needs to be utilized during the assembly phase; however, the part may still be termed as a floating center after fixing in place by an adhesive.

This floating design allows for the connector to tolerate an additional 0.020" inch (0.5 mm) of tolerance from the pin connection without causing the thin film plastic heater to stretch or wrinkle. This is especially important when installing several connector into a wing surface as maintaining the hole position tolerance is very challenging. The connector design maintains its flush surface mount properties to ensure aerodynamic performance. A vibration test has been performed on this connector design without any failures.

What is claimed:

1. A conductive assembly, comprising:
a heating element or antenna;
an airfoil having an aerodynamic surface;
a connector base forming a pathway from the interior of the airfoil to the aerodynamic surface;
a floating center disposed inside the connector base, wherein in a finished conductive assembly or in an intermediate structure, the floating center is able to move in the x and y directions but is immobilized in the z-direction; wherein the x, y, and z directions are mutually perpendicular; and
an electrical conductor disposed within the floating center.

2. The conductive assembly of claim 1 wherein an adhesive holds the floating center in place.

3. The conductive assembly of claim 1 further comprising an electrically-connected socket disposed in the floating center.

4. The conductive assembly of claim 1 wherein the floating center and connector base are electrically insulating.

5. A method of making the conductive assembly of claim 1, comprising:

providing an airfoil having an aerodynamic surface and a connector base forming a pathway from the interior of the airfoil to the aerodynamic surface;
inserting a floating center inside the connector base; and
placing an electrical conductor within the floating center.

6. The method of claim 5 where the step of inserting a floating center inside the connector base is conducted after the connector base is placed into the airfoil.

7. A method of heating or deicing an aerodynamic surface, or of powering an antenna on an airfoil, comprising passing an electric current through the conductive assembly of claim 1.

8. A flying vehicle comprising the conductive assembly of claim 1.

9. The conductive assembly of claim 2 wherein the adhesive is disposed in a groove between the connector base and the floating center.

10. A conductive assembly, comprising:
a heating element or antenna;
an airfoil having an aerodynamic surface;
a connector base forming a pathway from the interior of the airfoil to the aerodynamic surface;
a floating center disposed inside the connector base; and
an electrical conductor disposed within the floating center; and
further comprising a retaining ring disposed in the connector base that prevents the floating center from moving up through the airfoil surface.

11. The flying vehicle of claim 8 wherein the heater element or antenna is plugged into a socket that is disposed in the floating center.

12. The conductive assembly of claim 1 wherein the connector base and the floating center have the same length.

13. The conductive assembly of claim 3 wherein the heating element is plugged into the electrically-connected socket.

14. The conductive assembly of claim 3 wherein the antenna is plugged into the electrically-connected socket.

15. The conductive assembly of claim 10 wherein the retaining ring has a c-shape that acts as a spring by pressing against a rim of the connector base.

16. The conductive assembly of claim 10 wherein an adhesive holds the floating center in place.

17. The conductive assembly of claim 16 further comprising an electrically-connected socket disposed in the floating center.

18. The conductive assembly of claim 17 wherein the heating element is plugged into the electrically-connected socket.

19. The conductive assembly of claim 17 wherein the antenna is plugged into the electrically-connected socket.

20. A method of heating or deicing an aerodynamic surface, or of powering an antenna on an airfoil, comprising passing an electric current through the conductive assembly of claim 10 wherein the heating element or the antenna is plugged into an electrically connected socket disposed in the floating center.

* * * * *

UNITED STATES PATENT AND TRADEMARK OFFICE
CERTIFICATE OF CORRECTION

Page 1 of 1

| | |
|---|---|
| PATENT NO. | : 9,623,975 B2 |
| APPLICATION NO. | : 13/909061 |
| DATED | : April 18, 2017 |
| INVENTOR(S) | : Brett R. Burton, Andrew Cox and Darren Wolfe |

It is certified that error appears in the above-identified patent and that said Letters Patent is hereby corrected as shown below:

Column 1, Line 9, delete the following heading and paragraph:
"STATEMENT OF GOVERNMENT INTEREST
This work was conducted with funding from the U.S. government through Contract No. CON00008573. The government has certain rights in the invention."

Signed and Sealed this
Eighth Day of August, 2017

Joseph Matal
*Performing the Functions and Duties of the*
*Under Secretary of Commerce for Intellectual Property and*
*Director of the United States Patent and Trademark Office*